Oct. 21, 1969  J. L. MOLLER  3,473,692
EASY OPENING CONTAINER WITH PROTECTIVE BEAD
Filed Oct. 20, 1967

INVENTOR
JENS L. MOLLER
BY Mason, Porter, Diller & Brown
ATTORNEYS

United States Patent Office 3,473,692
Patented Oct. 21, 1969

3,473,692
EASY OPENING CONTAINER WITH PROTECTIVE BEAD
Jens L. Moller, Westmont, Ill., assignor to Continental Can Company, Inc., New York, N.Y., a corporation of New York
Filed Oct. 20, 1967, Ser. No. 676,854
Int. Cl. B65d 43/02, 17/16, 51/22
U.S. Cl. 220—47                                        10 Claims

ABSTRACT OF THE DISCLOSURE

This disclosure relates to an easy opening can end wherein the desired dispensing opening is first punched therein and thereafter a protective plastic bead is molded in place completely capsulating the raw edge defining the opening. Following this, an insert is positioned within the opening and interlocked with the bead. It is preferred that the insert be molded in situ and there be a predetermined bond between the plastic of the insert and the plastic of the protective bead, which bond is sufficient to retain the insert in place against normal pressures within the can while at the same time being readily rupturable for the use of a pull tab so as to facilitate an easy opening of the can. When the can is opened, the insert is removed, but the protective bead remains in place and serves to continue to protect the raw edge.

---

This invention relates in general to new and useful improvements in easy opening containers, and more particularly to an easy opening container member having a panel with an opening formed therein and defined by an internal edge of the panel, and the edge of the panel surrounding the opening being protected by a bead which extends entirely along the edge, the bead being permanently secured to the panel.

Another feature of this invention is to provide a container panel member with a dispensing opening wherein the edges thereof are permanently protected by a bead and wherein the opening is normally closed by means of an insert interlocked with the bead, the insert being removable with the bead remaining in place to continue to protect the edge of the opening.

Another feature of the invention is to provide a dispensing opening in a container with a protective bead, the protective bead being formed of plastic and being molded in situ with the bead being bonded to the container panel.

A further object of this invention is to provide a novel easy opening container member which includes a panel having an opening formed therein, such as by punching, the edge of the panel defining the opening being permanently protected by a plastic bead which is molded in situ and the opening defined by the bead being releasably closed by an insert which is also molded in situ and which is both mechanically interlocked with the bead and is bonded thereto, the insert being removable from the bead during the opening of the container with the bead remaining in place to protect the panel edge surrounding the opening.

With the above and other objects in view that will hereinafter appear, the nature of the invention will be more clearly understood by reference to the following detailed description, the appended claims and the several views illsutrated in the accompanying drawings.

Figure 1:
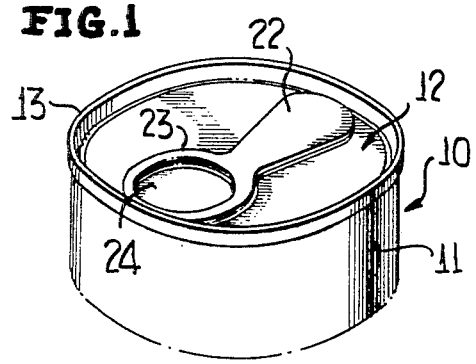
Figure 2:
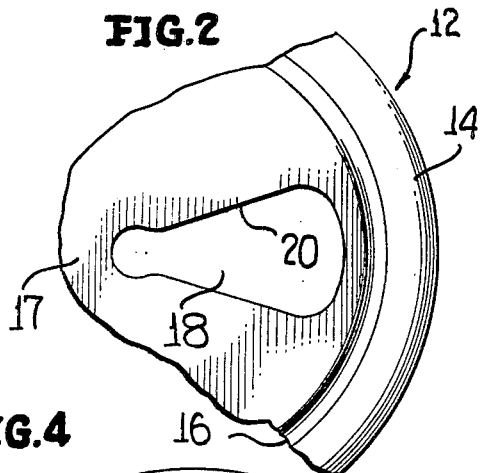

In the drawings:
FIGURE 1 is a fragmentary top perspective view of a container formed in accordance with this invention.
FIGURE 2 is a fragmentary plan view on an enlarged scale of a can end formed for use as part of the container of FIGURE 1.

Figure 3:
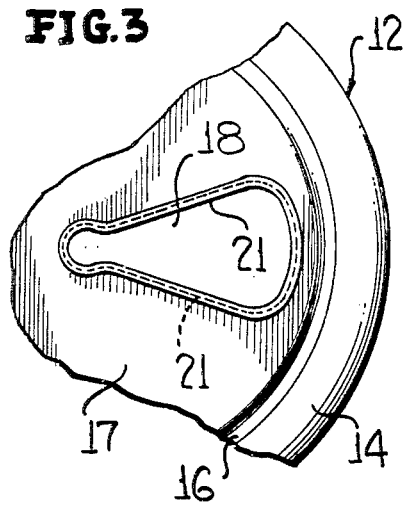
Figure 4:
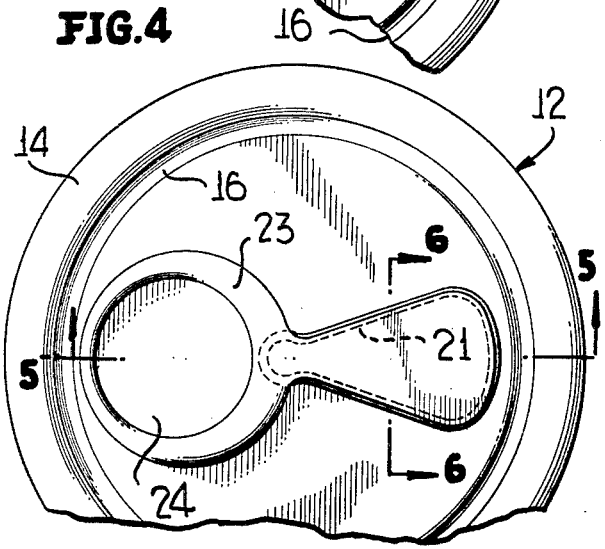
Figure 5:
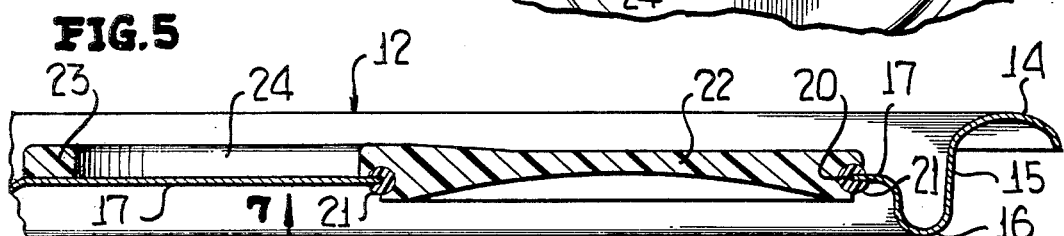
Figure 6:
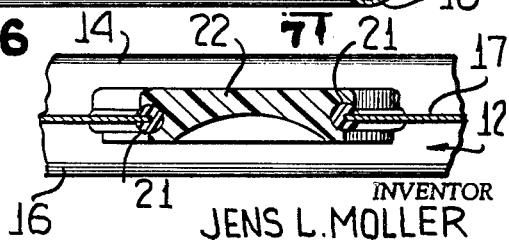
Figure 7:
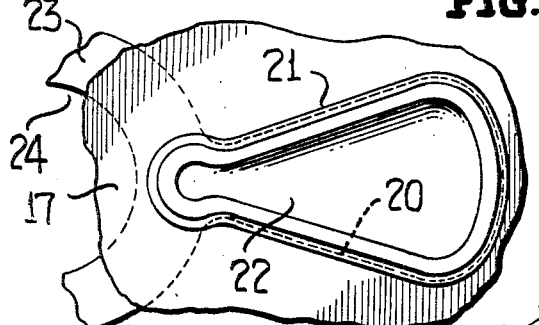

FIGURE 3 is a fragmentary plan view of the can end of FIGURE 2 with the protective bead applied around the opening.
FIGURE 4 is a fragmentary plan view of the completed can end.
FIGURE 5 is a transverse vertical sectional view taken along the line 5—5 of FIGURE 4 and shows specifically the details of construction of the easy opening portion of the can end.
FIGURE 6 is a fragmentary vertical sectional view taken along the line 6—6 of FIGURE 4 and shows further the details of the easy opening feature.
FIGURE 7 is an enlarged fragmentary bottom plan view of the can end taken generally along the line 7—7 of FIGURE 6.

Referring now to the drawings in detail, it will be seen that there is illustrated in FIGURE 1 an easy opening container formed in accordance with this invention, the container being generally referred to by the numeral 10. The container 10 includes a conventional body 11 of which only the upper portion is shown. The body 11 has the upper end thereof closed by means of an end which is generally referred to by the numeral 12 and which is secured to the body 11 by means of a conventional double seam 13.

Referring now to FIGURES 4 and 5 in particular, it will be seen that the end 12 includes a circumferential curl 14 which is utilized in the formation of the double seam 13. The curl 14 is carried by a chuck wall 15 which also becomes part of the double seam 13. Immediately radially inwardly of the chuck wall 15 there may be a shock absorbing bead 16. The can end 12 further includes an end panel 17.

Referring now to FIGURE 2 in particular, it will be seen that the end panel 17 first has a dispensing opening 18 punched therein. The dispensing opening 18 may be of any desired configuration and is defined by an internal edge 20 of the end panel 17. Normally the edge 20 will have a raw edge in view of the fact that the end 12 is preferably formed of metal, such as tin-free steel, tinplate and aluminum.

After the opening 18 has been punched in the end 12, the edge 20 is protected by forming a bead 21 therealong. The bead 21, as is clearly shown in FIGURE 5, is preferably of a circular cross section and is ejection molded in situ. The bead 21 is preferably formed of a plastic which will bond with the metal of the can end 12. It is to be understood that the bead 21 will remain permanently attached to the end panel 17 so as to provide permanent protection for the raw edge 20.

The end 12 is next provided with an insert 22 which is configurated to have a mechanical locking engagement with the bead 21, as is clearly shown in FIGURES 5 and 6. The insert 22 is also formed of a suitable plastic material and is preferably formed by injection molding in situ with the bead 21 forming a part of the mold for the insert 22 so as to assure a mechanical interlock between the insert 22 and the bead 21.

During the molding of the insert 22, there is also molded as an integral part of the insert 22 a pull tab or ring 23. It is to be noted from FIGURE 5 that the pull tab 23 lies flush on the outer surface of the end panel 17. The pull tab 23 has a suitable finger receiving opening 24 to facilitate the gripping thereof.

At this time it is pointed out that the insert 22 is formed of a plastic material which has sufficient resiliency to first permit the upward pivoting of the pull tab 23 to permit a firm grasping thereof. Secondly, the resiliency is of such a nature so as to permit the separation of the insert 22 from the bead 21 without disturbing the bead 21. The plastic material of the insert 22 has a further necessary characteristic which may vary with the intended use of the end 12. It is to be understood that normally the end 12 will be utilized in the packaging of a product under pressure and therefore, the mechanical interlock between the insert 22 and the bead 21 cannot solely be relied upon to maintain the insert in place and maintain a seal between the insert and the bead. Accordingly, it is desirable that the insert 22 bond to the bead 21. On the other hand, it is desired that the bond between the insert 22 and the bead 21 be of a readily rupturable nature which will facilitate the easy opening of the container 10 by merely pulling upwardly on the pull tab 23.

It is to be understood that inasmuch as the insert 22 is readily removable without disturbing the bead 21, the bead 21 will remain in place and continue to protect the raw edge 20. Thus one drinking from the container 10 will in no way be endangered by the raw edge 20 which normally exists when a metal panel portion is removed.

At this time it is pointed out that while the opening 18 is preferably formed in the end panel 17 of a can end, the invention is not so limited and the panel in which the opening 18 may be formed may be other panels of containers.

Although only a preferred embodiment of the invention has been specifically illustrated and described herein, it is to be understood that minor variations may be made in the container construction without departing from the spirit and scope of the invention, as defined by the appended claims.

I claim:

1. In an easy opening container member, a panel, an opening formed in said panel defined by an internal edge of said panel, a bead separate and apart from said panel extending entirely along said internal edge in protective relation and being permanently secured thereto, and a separate insert seated in said opening and normally interlocked with said bead against relative movement, said insert being formed of a flexible material and being sufficiently distortable upon the application of a removal force to be released from said bead leaving said bead intact and protectively defining said opening.

2. The container member of claim 1 wherein said bead is circular in section, and said insert has a part circular cross section peripheral recess receiving said bead.

3. The container member of claim 1 wherein said bead and said insert are both formed of plastic and are releasably bonded together.

4. The container member of claim 1 wherein said bead and said insert are both formed of plastic and are releasably bonded together, said bead and said insert being separately molded in situ.

5. The container member of claim 1 wherein said insert has an integral tab for facilitating the removal of said insert.

6. The container member of claim 1 wherein said insert has a tab for facilitating the removal of said insert, and said insert and said tab being integrally molded in situ with said tab lying flat on said panel.

7. The container member of claim 1 wherein said insert has an integral tab lying flat on said panel in a stored position and said tab is readily liftable to an elevated grippable position due to the flexibility of the material thereof.

8. The container member of claim 1 wherein said container member is a metal can end, and said can end is secured to a can body.

9. In an easy opening container member, a panel, a dispensing opening formed in said panel with said panel having an internal edge defining said dispensing opening, and a protective member extending entirely along said internal edge in protective relation thereto; said protective member having outer and inner portions overlying an outer surface and underlying an inner surface, respectively, of said panel, and an intermediate portion joining said outer and inner portions with said intermediate portion being positioned within said dispensing opening in opposing relation to said internal edge; and an insert seated in said dispensing opening and normally interlocked with said protective member against relative movement, said insert being formed of a flexible material and being sufficiently distortable upon the application of a removal force to be released from said protective member leaving said protective member intact and protectively defining said dispensing opening.

10. The easy opening container member of claim 9 wherein said protective member is permanently bonded to said panel.

References Cited
UNITED STATES PATENTS

| | | | |
|---|---|---|---|
| 3,184,096 | 5/1965 | Cheeley | 220—46 |
| 3,313,445 | 4/1967 | Brandl | 220—46 |
| 3,349,955 | 10/1967 | Cornelius | 220—24 |

GEORGE T. HALL, Primary Examiner

U.S. Cl. X.R.

220—53, 60, 90.6